US009807093B2

(12) United States Patent
Massand

(10) Patent No.: US 9,807,093 B2
(45) Date of Patent: *Oct. 31, 2017

(54) METHODS AND SYSTEMS FOR REMOTELY REMOVING METADATA FROM ELECTRONIC DOCUMENTS

(71) Applicant: LITERA CORPORATION, McLeansville, NC (US)

(72) Inventor: Deepak Massand, McLeansville, NC (US)

(73) Assignee: LITERA CORPORATION, McLeansville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,585

(22) Filed: Jan. 29, 2015

(65) Prior Publication Data

US 2015/0143548 A1    May 21, 2015

Related U.S. Application Data

(63) Continuation of application No. 13/683,676, filed on Nov. 21, 2012, now Pat. No. 8,977,697, and a
(Continued)

(51) Int. Cl.
*H04L 12/58* (2006.01)
*H04L 29/06* (2006.01)
*G06Q 10/10* (2012.01)

(52) U.S. Cl.
CPC .......... *H04L 63/10* (2013.01); *G06Q 10/107* (2013.01); *H04L 51/00* (2013.01); *H04L 51/063* (2013.01); *H04L 51/08* (2013.01); *H04L 51/12* (2013.01); *H04L 63/0428* (2013.01); *H04L 63/1441* (2013.01)

(58) Field of Classification Search
CPC ... H04L 63/10; H04L 63/0428; H04L 63/145; H04L 63/1441; H04L 67/28; H04L 67/2852; H04L 51/12; H04L 51/18; H04L 12/585; G06F 21/51
See application file for complete search history.

(56) References Cited

U.S. PATENT DOCUMENTS 3,920,895 A    11/1975  Vieri et al.
3,920,896 A    11/1975  Bishop et al.
(Continued)

OTHER PUBLICATIONS

Petition for Inter Partes Review of U.S. Pat. No. 7,895,276 in *DocsCorp LLC* v. *Litera Technologies LLC*, Case IPR2016-00541 (70 pages), 2016.
(Continued)

*Primary Examiner* — Linglan Edwards
(74) *Attorney, Agent, or Firm* — Finnegan, Henderson, Farabow, Garrett & Dunner LLP

(57) ABSTRACT

A method and system for remotely removing metadata from electronic documents includes receiving an electronic document from an electronic device, determining that the electronic document includes a pre-determined type of metadata, and generating a request for confirmation that at least a portion of the pre-determined type of metadata should be removed. Based on the confirmation, at least a portion of the pre-determined type of metadata is removed from the electronic document before it is transmitted.

20 Claims, 4 Drawing Sheets

Related U.S. Application Data continuation of application No. 13/270,915, filed on Oct. 11, 2011, now abandoned, and a continuation of application No. 13/018,509, filed on Feb. 1, 2011, now Pat. No. 8,060,575, and a continuation of application No. 11/699,750, filed on Jan. 29, 2007, now Pat. No. 7,895,276.

(56) References Cited

U.S. PATENT DOCUMENTS

| | | |
|---|---|---|
| 5,008,853 A | 4/1991 | Bly et al. |
| 5,129,082 A | 7/1992 | Tirfing et al. |
| 5,146,552 A | 9/1992 | Cassorla et al. |
| 5,204,947 A | 4/1993 | Bernstein et al. |
| 5,321,505 A | 6/1994 | Leddy |
| 5,341,469 A | 8/1994 | Rossberg et al. |
| 5,515,491 A | 5/1996 | Bates et al. |
| 5,539,871 A | 7/1996 | Gibson |
| 5,596,700 A | 1/1997 | Darnell et al. |
| 5,596,705 A | 1/1997 | Reimer et al. |
| 5,659,676 A | 8/1997 | Redpath |
| 5,664,208 A | 9/1997 | Pavley et al. |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |
| 5,781,901 A | 7/1998 | Kuzma |
| 5,787,175 A | 7/1998 | Carter |
| 5,799,191 A | 8/1998 | Moriyasu et al. |
| 5,801,702 A | 9/1998 | Dolan et al. |
| 5,809,512 A | 9/1998 | Kato |
| 5,860,073 A | 1/1999 | Ferrel et al. |
| 5,864,870 A | 1/1999 | Guck |
| 5,870,754 A | 2/1999 | Dimitrova et al. |
| 5,878,421 A | 3/1999 | Ferrel et al. |
| 5,890,177 A | 3/1999 | Moody et al. |
| 5,893,126 A | 4/1999 | Drews et al. |
| 5,911,776 A | 6/1999 | Guck |
| 5,931,906 A | 8/1999 | Fidelibus, Jr. et al. |
| 5,937,066 A | 8/1999 | Gennaro et al. |
| 5,938,724 A | 8/1999 | Pommier et al. |
| 5,944,785 A | 8/1999 | Pommier et al. |
| 5,949,413 A | 9/1999 | Lerissa et al. |
| 5,950,214 A | 9/1999 | Rivette et al. |
| 5,956,736 A | 9/1999 | Hanson et al. |
| 5,958,006 A | 9/1999 | Eggleston et al. |
| 5,978,836 A | 11/1999 | Ouchi |
| 5,987,469 A | 11/1999 | Lewis et al. |
| 6,009,462 A | 12/1999 | Birrell et al. |
| 6,014,135 A | 1/2000 | Fernandes |
| 6,029,171 A | 2/2000 | Smiga et al. |
| 6,064,751 A | 5/2000 | Smithies et al. |
| 6,067,551 A | 5/2000 | Brown et al. |
| 6,073,142 A | 6/2000 | Geiger et al. |
| 6,088,709 A | 7/2000 | Watanabe |
| 6,119,147 A | 9/2000 | Toomey et al. |
| 6,158,903 A | 12/2000 | Schaeffer et al. |
| 6,178,431 B1 | 1/2001 | Douglas |
| 6,182,080 B1 | 1/2001 | Clements |
| 6,212,534 B1 | 4/2001 | Lo et al. |
| 6,243,722 B1 | 6/2001 | Day et al. |
| 6,289,460 B1 | 9/2001 | Hajmiragha |
| 6,317,777 B1 | 11/2001 | Skarbo et al. |
| 6,334,141 B1 | 12/2001 | Varma et al. |
| 6,336,134 B1 | 1/2002 | Varma |
| 6,343,313 B1 | 1/2002 | Salesky et al. |
| 6,360,236 B1 | 3/2002 | Khan et al. |
| 6,363,352 B1 | 3/2002 | Dailey et al. |
| 6,411,989 B1 | 6/2002 | Anupam et al. |
| 6,560,637 B1 | 5/2003 | Dunlap et al. |
| 6,590,584 B1 | 7/2003 | Yamaura et al. |
| 6,643,663 B1 | 11/2003 | Dabney et al. |
| 6,681,371 B1 | 1/2004 | Devanbu |
| 6,687,878 B1 | 2/2004 | Eintracht et al. |
| 6,708,172 B1 | 3/2004 | Wong et al. |
| 7,103,915 B2 | 9/2006 | Redlich et al. |
| 7,113,948 B2 | 9/2006 | Jhingan et al. |
| 7,212,814 B2 | 5/2007 | Wilson et al. |
| 7,251,680 B2 | 7/2007 | DeVos |
| 7,424,513 B2 * | 9/2008 | Winjum ............... G06Q 10/107 |
| | | 707/999.202 |
| 7,570,964 B2 | 8/2009 | Maes |
| 7,623,515 B2 | 11/2009 | Breuer et al. |
| 7,634,814 B1 * | 12/2009 | Sobel .................... G06F 21/51 |
| | | 709/205 |
| 7,640,308 B2 * | 12/2009 | Antonoff ............... H04L 67/28 |
| | | 709/206 |
| 7,895,166 B2 | 2/2011 | Foygel et al. |
| 7,895,276 B2 | 2/2011 | Massand |
| 8,060,575 B2 | 11/2011 | Massand |
| 8,065,424 B2 | 11/2011 | Foresti et al. |
| 2001/0037367 A1 | 11/2001 | Iyer |
| 2002/0049786 A1 | 4/2002 | Bibliowicz et al. |
| 2002/0059342 A1 | 5/2002 | Gupta et al. |
| 2002/0059343 A1 | 5/2002 | Kurishima et al. |
| 2002/0065848 A1 | 5/2002 | Walker et al. |
| 2002/0078088 A1 | 6/2002 | Kuruoglu et al. |
| 2002/0085030 A1 | 7/2002 | Ghani |
| 2002/0091741 A1 | 7/2002 | Ferreira et al. |
| 2002/0107886 A1 | 8/2002 | Gentner et al. |
| 2002/0143691 A1 | 10/2002 | Ramaley et al. |
| 2003/0112273 A1 | 6/2003 | Hadfield et al. |
| 2003/0145017 A1 | 7/2003 | Patton et al. |
| 2003/0158855 A1 | 8/2003 | Farnham et al. |
| 2003/0197730 A1 | 10/2003 | Kakuta et al. |
| 2004/0085354 A1 | 5/2004 | Massand |
| 2004/0203947 A1 | 10/2004 | Moles |
| 2004/0205653 A1 | 10/2004 | Hadfield et al. |
| 2005/0060375 A1 | 3/2005 | Ernest et al. |
| 2006/0069733 A1 | 3/2006 | Antonoff et al. |
| 2006/0075041 A1 * | 4/2006 | Antonoff ............... H04L 67/28 |
| | | 709/206 |
| 2006/0089931 A1 | 4/2006 | Giacobbe et al. |
| 2006/0167879 A1 | 7/2006 | Umeki et al. |
| 2006/0253482 A1 | 11/2006 | Zellweger et al. |
| 2007/0016613 A1 | 1/2007 | Foresti et al. |
| 2007/0067397 A1 * | 3/2007 | Tran ..................... G06Q 10/107 |
| | | 709/206 |
| 2007/0143425 A1 | 6/2007 | Kiesilbach et al. |
| 2007/0186157 A1 | 8/2007 | Walker et al. |
| 2008/0162652 A1 | 7/2008 | True et al. |
| 2008/0183824 A1 | 7/2008 | Chen et al. |
| 2008/0215509 A1 | 9/2008 | Charlton |
| 2008/0280633 A1 | 11/2008 | Agiv |
| 2012/0011207 A1 * | 1/2012 | Morris .................... H04L 51/00 |
| | | 709/206 |
| 2013/0254528 A1 | 9/2013 | Brown et al. |

OTHER PUBLICATIONS

Declaration of Dr. Michael J. Freedman in Support of Petition for Inter Partes Review of U.S. Pat. No. 7,895,276 in *DocsCorp LLC* v. *Litera Technologies LLC*, Case IPR2016-00541 (138 pages), 2016.
Petition for Inter Partes Review of U.S. Pat. No. 8,060,575 in *DocsCorp LLC* v. *Litera Technologies LLC*, Case IPR2016-00542 (72 pages), 2016.
Declaration of Dr. Michael J. Freedman in Support of Petition for Inter Partes Review of U.S. Pat. No. 8,060,575 in *DocsCorp LLC* v. *Litera Technologies LLC*, Case IPR2016-00542 (143 pages), 2016.
Ex. 1003 to Petition in Cases IPR2016-00541 and IPR2016-00542, KKL Software webpage on the 2004 ezClean software website by Kraft Kennedy Lessar, Inc. (2 pages).

(56) References Cited

OTHER PUBLICATIONS

Ex. 1004 to Petition in Cases IPR2016-00541 and IPR2016-00542, ezClean details webpage on the 2004 ezClean software website by Kraft Kennedy Lessar, Inc. (4 pages).
Ex. 1005 to Petition in Cases IPR2016-00541 and IPR2016-00542, ezClean New Features webpage on the 2004 ezClean software website by Kraft Kennedy Lessar, Inc. (3 pages).
Ex. 1006 to Petition in Cases IPR2016-00541 and IPR2016-00542, ezClean 3.2 New Features webpage on the 2004 ezClean software website by Kraft Kennedy Lessar, Inc. (3 pages).
Ex. 1007 to Petition in Cases IPR2016-00541 and IPR2016-00542, ezClean FAQ webpage on the 2004 ezClean software website by Kraft Kennedy Lessar, Inc. (3 pages).
Ex. 1008 to Petition in Cases IPR2016-00541 and IPR2016-00542, ezClean Version 3.3 Installation Guide and Admin Manual by KKL Software on the 2005 ezClean software website by Kraft Kennedy Lessar, Inc. (36 pages).
Ex. 1009 to Petition in Cases IPR2016-00541 and IPR2016-00542, Declaration of Christopher Butler, Office Manager at the Internet Archive, dated Nov. 17, 2015 (2 pages).
Ex. 1010 to Petition in Cases IPR2016-00541 and IPR2016-00542, Exhibit A to the Declaration of Christopher Butler (55 pages), 2006.
Ex. 1011 to Petition in Cases IPR2016-00541 and IPR2016-00542, U.S. Pat. No. 7,640,308 to Antonoff (12 pages), Dec. 29, 2009.
Ex. 1012 to Petition in Cases IPR2016-00541 and IPR2016-00542, U.S. Pat. No. 7,570,964 to Maes (12 pages), Aug. 4, 2009.
Ex. 1013 to Petition in Cases IPR2016-00541 and IPR2016-00542, U.S. Pat. No. 8,209,538 to Craigie (10 pages), Jun. 26, 2012.
Ex. 1014 to Petition in Cases IPR2016-00541 and IPR2016-00542, CS MAILsweeper 4.3 for SMTP by Clearswift Ltd (2002) (5 pages).
Ex. 1015 to Petition in Cases IPR2016-00541 and IPR2016-00542, MIMEsweeper Solutions webpage on the 2002 website (2 pages).
Ex. 1016 to Petition in Cases IPR2016-00541 and IPR2016-00542, Lotus Announces cc Mail for the World Wide Web, Provides Easy Access to EMail Via the Web, PR Newswire (Sep. 26, 1995) (4 pages).
Ex. 1017 to Petition in Cases IPR2016-00541 and IPR2016-00542, Simple Mail Transfer Protocol, Internet Engineering Task Force (IETF), RFC 821 (Aug. 1982) (73 pages).
Ex. 1018 to Petition in Cases IPR2016-00541 and IPR2016-00542, MIME (Multipurpose Internet Mail Extensions) Mechanisms for Specifying and Describing the Format of Internet Message Bodies, Internet Engineering Task Force (IETF), RFC 1341 (Jun. 1992) (71 pages).
Ex. 1019 to Petition in Case IPR2016-00541 and IPR2016-00542, Middleboxes Taxonomy and Issues, Internet Engineering Task Force (IETF), RFC 3234 (Feb. 2002) (28 pages).
Patent Owner's Preliminary Response in Case IPR2016-00541 in *DocsCorp LLC v. Litera Technologies LLC*, Case IPR2016-00541 (59 pages), May 10, 2016.
Patent Owner's Preliminary Response in Case IPR2016-00542 in *DocsCorp LLC v. Litera Technologies LLC*, Case IPR2016-00542 (59 pages), May 10, 2016.
Co-pending U.S. Appl. No. 11/444,140, filed May 30, 2006, to Deepak Massand, entitled "Method of Compound Document Comparison".
Co-pending U.S. Appl. No. 12/406,093, filed Mar. 17, 2009, to Deepak Massand, entitled "System and Method For the Comparison of Content Within Tables Separate From Form and Structure".
Co-pending U.S. Appl. No. 12/350,144, filed Jan. 7, 2009, to Deepak Massand, entitled "System and Method for Comparing digital Data in spreadsheets or Database Tables".
Ex. 2021 in Case Nos. IPR2016-00541 and IPR2016-00542, Internet Archive webpage, *Information Requests—The Internet Archive's Policy for Responding to Information Requests*, https://archive.org/legal (last accessed Sep. 26, 2016) (2 pages).
Ex. 2022 in Case Nos. IPR2016-00541 and IPR2016-00542, Internet Archive webpage, *Standard Affidavit*, https://archive.org/legal/affidavit.php (last accessed Sep. 26, 2016) (1 page).
Ex. 2023 in Case Nos. IPR2016-00541 and IPR2016-00542, Internet Archive webpage, *Legal Frequently Asked Questions*, https://archive.org/legal/faq.php (last accessed Sep. 26, 2016) (4 pages).
Ex. 2024 in Case Nos. IPR2016-00541 and IPR2016-00542, Internet Archive webpage, https://web.archive.org/web/20070202072717/http:/kklsoftware.com (last accessed Sep. 29, 2016) (1 page).
Ex. 2025 in Case Nos. IPR2016-00541 and IPR2016-00542, Internet Archive webpage, https://web.archive.org/web/20060414015245/http:/kklsoftware.com (last accessed Sep. 29, 2016) (1 page).
Ex. 2026 in Case Nos. IPR2016-00541 and IPR2016-00542, Internet Archive webpage, https://web.archive.org/web/20050405051007/http:/www.kklsoftware.com (last accessed Sep. 29, 2016) (1 page).
Ex. 2027 in Case Nos. IPR2016-00541 and IPR2016-00542, Cross-examination transcript of Christopher Butler, dated Oct. 6, 2016 (53 pages).
Ex. 2028 in Case Nos. IPR2016-00541 and IPR2016-00542, International Legal Technology Association, ILTA's 2006 Technology Survey, Aug. 2006 (24 pages).
Ex. 2029 in Case Nos. IPR2016-00541 and IPR2016-00542, MIT Sloan Alumni webpage bio, *Michael J. Freedman, SB 2001, MNG 2002*, http://mitsloan.mit.edu/alumni/events/iot-series-bios-freedman/ (last accessed Oct. 17, 2016) (2 pages).
Ex. 2030 in Case Nos. IPR2016-00541 and IPR2016-00542, M. Freedman, et al., *SANE: A Protection Architecture for Enterprise Networks* (Aug. 2006) (15 pages).
Ex. 2031 in Case Nos. IPR2016-00541 and IPR2016-00542, M. Freedman, et al., *Shark: Scaling File Servers via Cooperative Caching* (May 2005) (14 pages).
Ex. 2032 in Case Nos. IPR2016-00541 and IPR2016-00542, M. Freedman, et al., *Economic Barriers to the Deployment of Existing Privacy Technologies* (May 2002) (3 pages).
Ex. 2037 in Case Nos. IPR2016-00541 and IPR2016-00542, Webster's New World Computer Dictionary (10th ed. 2003) (excerpts) (6 pages).
Ex. 2038 in Case Nos. IPR2016-00541 and IPR2016-00542, U.S. Department of Labor, Occupational Outlook Handbook 2006-2007 (2006) (excerpts) (6 pages).
Ex. 2039 in Case Nos. IPR2016-00541 and IPR2016-00542, B. Burney, *Software Shootout: Disappearing Data, Metadata Assistant and Workshare Metawall Can Make Metadata a Thing of the Past*, 30 Law Office Computing 41-43 (2003) (5 pages).
Ex. 2040 in Case Nos. IPR2016-00541 and IPR2016-00542, Microsoft Computer Dictionary (5th ed. 2002) (excerpts) (7 pages).
Ex. 2041 in Case Nos. IPR2016-00541 and IPR2016-00542, M. Haider and Networks First, Market Insight Paper, *The Impact of Network Downtime on Businesses Today* (Jul. 2007) (19 pages).
Ex. 2042 in Case Nos. IPR2016-00541 and IPR2016-00542, W. Schmied & K. Miller, MCTS Microsoft® Exchange Server 2007 Configuration Study Guide (2007) (excerpts) (5 pages).
Ex. 2043 in Case Nos. IPR2016-00541 and IPR2016-00542, Microsoft® Exchange Server 2007: Tony Redmond's Guide (2007) (excerpts) (5 pages).
Ex. 2044 in Case Nos. IPR2016-00541 and IPR2016-00542, ZDNet, *Lack of email 'more traumatic than divorce'*, http://www.zdnet.com/article/lack-of-email-more-traumatic-than-divorce/ (Jun. 5, 2003) (last accessed Oct. 30, 2016) (4 pages).
Ex. 2045 in Case Nos. IPR2016-00541 and IPR2016-00542, BBC News, *Loss of e-mail 'worse than divorce'*, http://news.bbc.co.uk/2/hi/technology/3104889.stm (Jul. 29, 2003) (last accessed Oct. 17, 2016) (2 pages).
Ex. 2046 in Case Nos. IPR2016-00541 and IPR2016-00542, C. Luce, *What's the Matter with Metadata?*, The Colorado Lawyer, Official Publication of the Colorado Bar Association (Nov. 2007) (10 pages).
Ex. 2047 in Case Nos. IPR2016-00541 and IPR2016-00542, M. Betts, Computerworld, *The No. 1 Cause of IT Failure: Complexity*, http://www.computerworld.com/article/2550521/enterprise-applications/the-no--1-cause-of-it-failure--complexity.html (Dec. 21, 2009) (last accessed Sep. 29, 2016) (3 pages).

(56) References Cited

OTHER PUBLICATIONS

Ex. 2048 in Case Nos. IPR2016-00541 and IPR2016-00542, J. Wortham, *Customers Angered as iPhones Overload AT&T*, New York Times (Sep. 2, 2009), available at http://www.nytimes.com/2009/09/03/technology/companies/03att.html (last accessed Sep. 26, 2016) (2 pages).
Ex. 2049 in Case Nos. IPR2016-00541 and IPR2016-00542, D. Chaffey, *Email client popularity*, Smart Insights Marketing Intelligence Ltd. (Jan. 12, 2011), available at http://www.smartinsights.com/email-marketing/email-marketing-analytics/most-popular-email-marketing-clients/attachment/email-client-popularity/ (last accessed Sep. 30, 2016) (1 page).
Ex. 2050 in Case Nos. IPR2016-00541 and IPR2016-00542, D. Chaffey, *The most popular email marketing clients?*, Smart Insights Marketing Intelligence Ltd. (Jan. 23, 2014), available at http://www.smartinsights.com/email-marketing/email-marketing-analytics/most-popular-email-marketing-clients/ (last accessed Sep. 30, 2016) (7 pages).
Ex. 2051 in Case Nos. IPR2016-00541 and IPR2016-00542, BlackBerry, User Guide: BlackBerry 8100 Smartphone (2008) (283 pages).
Ex. 2052 in Case Nos. IPR2016-00541 and IPR2016-00542, Apple Press Release, *iPhone Premieres This Friday Night at Apple Retail Stores* (Jun. 28, 2007), available at http://www.apple.com/pr/library/2007/06/28/iPhone-Premieres-This-Friday-Night-at-Apple-Retail-Stores.html (last accessed Sep. 27, 2016) (3 pages).
Ex. 2053 in Case Nos. IPR2016-00541 and IPR2016-00542, T-Mobile Press Release, *T-Mobile Unveils the T-Mobile G1—the First Phone Powered by Android* (Sep. 23, 2008), available at https://newsroom.t-mobile.com/news-and-blogs/t-mobile-unveils-the-t-mobile-g1-the-first-phone-powered-by-android.htm (last accessed Sep. 27, 2016) (3 pages).
Ex. 2054 in Case Nos. IPR2016-00541 and IPR2016-00542, K. German, CNET, *A Brief History of Android Phones* (Aug. 2, 2011), available at https://www.cnet.com/news/a-brief-history-of-android-phones/ (last accessed Oct. 30, 2016) (12 pages).
Ex. 2055 in Case Nos. IPR2016-00541 and IPR2016-00542, Open Handset Alliance Press Release, *Industry Leaders Announce Open Platform for Mobile Devices* (Nov. 5, 2007), available at http://www.openhandsetalliance.com/press_110507.html (last accessed Oct. 30, 2016) (6 pages).
Ex. 2056 in Case Nos. IPR2016-00541 and IPR2016-00542, S. Kerner, InternetNews.com, *Report: Symbian at a Mobile Loss* (Feb. 10, 2006), available at http://www.internetnews.com/wireless/print.php/3584431 (last accessed Sep. 15, 2016) (1 page).
Ex. 2057 in Case Nos. IPR2016-00541 and IPR2016-00542, BlackBerry User Guide, BlackBerry 7100 and 7130, Version 4.1 (2006) (162 pages).
Ex. 2058 in Case Nos. IPR2016-00541 and IPR2016-00542, S. Segan, PC Magazine Product Review, *RIM BlackBerry 7130c* (Jul. 5, 2006), available at http://www.pcmag.com/article2/0,2817,1984923,00.asp (last accessed Oct. 5, 2016) (4 pages).
Ex. 2059 in Case Nos. IPR2016-00541 and IPR2016-00542, BlackBerry Press Release for BlackBerry® Pearl™ 8100™ (Sep. 2006), available at http://www.blackberry.com/newsletters/connection/small_business/Sept2006/Sept2006-smbiz-blackberry-pearl.shtml?cp=NLC-30 (last accessed Oct. 5, 2016) (2 pages).
Ex. 2060 in Case Nos. IPR2016-00541 and IPR2016-00542, Verizon News Release for BlackBerry Pearl 8130, *Verizon Wireless Launches the First CDMA-Enabled BlackBerry Pearl* (Oct. 31, 2007), available at http://www.verizonwireless.com/news/article/2007/11/pr2007-11-01b.html (last accessed Oct. 5, 2016) (2 pages).
Ex. 2061 in Case Nos. IPR2016-00541 and IPR2016-00542, BlackBerry, User Guide: BlackBerry Pearl 8130 Smartphone (2007) (270 pages).
Ex. 2062 in Case Nos. IPR2016-00541 and IPR2016-00542, C. Albanesius, PC Magazine, *Did AT&T Quietly Improve EDGE Data Rates for iPhone* (Jun. 29, 2007), available at http://www.pcmag.com/article2/0,2817,2152744,00.asp (last accessed Oct. 5, 2016) (2 pages).
Ex. 2063 in Case Nos. IPR2016-00541 and IPR2016-00542, K. Komando, USA Today, *Get Online with Laptop Cellular Card* (Feb. 15, 2007), available at http://usatoday30.usatoday.com/tech/columnist/kimkomando/2007-02-15-laptop-cellular-card_x.htm (last accessed Oct. 5, 2016) (2 pages).
Ex. 2065 in Case Nos. IPR2016-00541 and IPR2016-00542, Microsoft TechNet, *How Terminal Services Works* (Mar. 28, 2003), available at https://technet.microsoft.com/en-us/library/cc755399(v=ws.10).aspx (last accessed Oct. 5, 2015) (14 pages).
Ex. 2066 in Case Nos. IPR2016-00541 and IPR2016-00542, Microsoft TechNet, *Remote Desktop Services Overview* (May 7, 2014), available at https://technet.microsoft.com/library/hh831447.aspx (last accessed Oct. 5, 2015) (5 pages).
Ex. 2067 in Case Nos. IPR2016-00541 and IPR2016-00542, RFC 2821, Simple Mail Transfer Protocol (Apr. 2001) (74 pages).
Ex. 2069 in Case Nos. IPR2016-00541 and IPR2016-00542, Software Security Solutions, White Paper, *Choosing Anti-Virus Software, A Guide to Selecting the Right Solution for Your Business* (2007) (16 pages).
Ex. 2070 in Case Nos. IPR2016-00541 and IPR2016-00542, Microsoft TechNet, *Managing Global Address Lists* (Jan. 31, 2007), available at https://technet.microsoft.com/en-us/library/bb232101(v=exchg.80).aspx (last accessed Oct. 30, 2016) (2 pages).
Ex. 2071 in Case Nos. IPR2016-00541 and IPR2016-00542, Statista, *Global Smartphone Shipments by BlackBerry (RIM) from 2007 to 2013*, available at https://www.statista.com/statistics/263395/rim-smartphones-shipped-worldwide-since-1st-quarter-2007/ (last accessed Oct. 28, 2016) (3 pages).
Ex. 2072 in Case Nos. IPR2016-00541 and IPR2016-00542, BlackBerry Limited, SEC Form 40-F (Mar. 27, 2015) (excerpts) (15 pages).
Ex. 2073 in Case Nos. IPR2016-00541 and IPR2016-00542, Statista, *Global Annual Shipments of Smartphones Using the Android Operating System from 2007 to 2016*, available at https://www.statista.com/statistics/241947/global-shipment-forecast-of-smartphones-using-android-os/(last accessed Oct. 28, 2016) (3 pages).
Ex. 2074 in Case Nos. IPR2016-00541 and IPR2016-00542, Statista, *Unit Sales of the Apple iPhone Worldwide from 2007 to 2015*, available at https://www.statista.com/statistics/276306/global-apple-iphone-sales-since-fiscal-year-2007/ (last accessed Oct. 28, 2016) (3 pages).
Ex. 2075 in Case Nos. IPR2016-00541 and IPR2016-00542, Mobile Broadband Reviews, *2010 Wireless Broadband Reviews*, available at http://www.mobile-broadband-reviews.com/wireless-broadband-reviews.html (last accessed Oct. 28, 2016) (19 pages).
Ex. 2076 in Case Nos. IPR2016-00541 and IPR2016-00542, D. Andersen, Root Metrics, *Mobile Network Performance in the United States* (Aug. 18, 2015) (47 pages).
Ex. 2078 in Case Nos. IPR2016-00541 and IPR2016-00542, Cross-examination transcript of Michael J. Freedman, dated Oct. 21, 2016 (147 pages).
Cross-examination transcript of John Guyer in Case Nos. IPR2016-00541 and IPR2016-00542, dated Jan. 27, 2017 (232 pages).
M. Silver et al., *Plan to Deal with Metadata Issues with Windows Vista*, Gartner (Dec. 21, 2005) (8 pages).
J. Kirk, *Gartner warns of metadata trouble with Vista OS*, Network World (Dec. 23, 2005) (3 pages).
Termination Decision in Case Nos. IPR2016-00541 and IPR2016-00542, dated Mar. 15, 2017 (4 pages).
Institution Decision in *DocsCorp LLC v. Litera Techs. LLC*, Case No. IPR2016-00541 (22 pages) (Aug. 4, 2016).
Institution Decision in *DocsCorp LLC v. Litera Techs. LLC*, Case No. IPR2016-00542 (23 pages) (Aug. 4, 2016).
Patent Owner Response in Case No. IPR2016-00541 (81 pages) (Nov. 4, 2016).
Ex. 2077 (Expert Declaration of John Guyer) in Case No. IPR2016-00541 (192 pages) (Nov. 4, 2016).
Patent Owner Response in *DocsCorp LLC v. Litera Techs. LLC*, Case No. IPR2016-00542 (80 pages) (Nov. 4, 2016).

(56) References Cited

OTHER PUBLICATIONS

Ex. 2077 (Expert Declaration of John Guyer) in *DocsCorp LLC* v. *Litera Techs. LLC*, Case No. IPR2016-00542 (191 pages) (Nov. 4, 2016).
Ex. 2033 in Case Nos. IPR2016-00541 and IPR2016-00542, DocsCorp White Paper, Metadata Management in 2015 Requires a Rethink . . . (8 pages) (2015).
Ex. 2034 in Case Nos. IPR2016-00541 and IPR2016-00542, DocsCorp, cleanDocs Datasheet (available at http://www.docscorp.com/Documents/Product%20datasheets/cleanDocs_datasheet.pdf) (2 pages) (last accessed Oct. 2016).
Ex. 2035 in Case Nos. IPR2016-00541 and IPR2016-00542, Declaration of Michael J. Freedman in CBM2013-00025 (20 pages) (Mar. 12, 2014).
Ex. 2036 in Case Nos. IPR2016-00541 and IPR2016-00542, U.S. Appl. No. 11/699,750 (20 pages) (Jan. 29, 2017).
Ex. 2064 in Case Nos. IPR2016-00541 and IPR2016-00542, U.S. Pat. No. 8,745,084, assigned to DocsCorp Australia, Sydney (AU) (15 pages) (Jun. 3, 2014).
Ex. 2068 in Case Nos. IPR2016-00541 and IPR2016-00542, Screenshots from Microsoft Outlook 2016, prepared by John Guyer (3 pages) (2016).
Ex. 2079 in Case No. IPR2016-00541, U.S. Pat. No. 8,060,575 (11 pages) (Nov. 15, 2011).
Ex. 2079 in Case No. IPR2016-00542, U.S. Pat. No. 7,895,276 (11 pages) (Feb. 22, 2011).

\* cited by examiner

METHODS AND SYSTEMS FOR REMOTELY REMOVING METADATA FROM ELECTRONIC DOCUMENTS

This is a continuation of U.S. application Ser. No. 13/683,676, filed Nov. 21, 2012, now U.S. Pat. No. 8,977,697, which is a continuation of U.S. application Ser. No. 13/270,915, filed Oct. 11, 2011, which is a continuation of U.S. application Ser. No. 13/018,509, now U.S. Pat. No. 8,060,575, filed Feb. 1, 2011, which is a continuation of U.S. application Ser. No. 11/699,750, now U.S. Pat. No. 7,895,276, filed Jan. 29, 2007, all of which are incorporated herein by reference.

BACKGROUND

Field of the Invention

The field of the invention relates generally to systems and methods of providing security for data. More particularly, the preferred embodiment relates to electronic cleaning metadata from email attachments, which may be sent from webmail on Exchange or PDA, handheld or mobile devices such as Blackberry, Treo etc.

Related Background

Electronic documents often include metadata relating to changes or prior versions of the document which may not be readily apparent to a person viewing the document in an application. For example, a Word document may include history information which is not displayed to a person viewing the document using Word on a PC (or may not be displayed in all views of a document). This is true for other types of electronic documents, including PDFs, Excel Spreadsheets, etc. Additionally, electronic documents may include additional metadata concerning the document, such as when the document was created, who created the document, etc. While many users may not be concerned with such information, such information may include sensitive or proprietary information that a user, or others, may not wish to share when the electronic document is shared. For example, a user emailing an electronic document may wish not to share some information relating to the history or creation of the document (or the user's employer may wish the user did not share such information outside the company).

The problem of document metadata is made more complicated by the use of smart phones, PDAs, and other mobile devices which may be used to send email, including email with attachments.

Conventional email and document editing and creation systems allow users to share electronic documents, but also allow users to share documents with sensitive metadata. Many desktop based Metadata removal products exist today including Metadata Sweeper by Litera Corp.®, Out of Sight by SoftWise™, Protect by Workshare™, Metadata Assistant by Payne Consulting™ and iScrub by Esquire Innovations™, etc. None of these products offer Metadata cleaning of Documents attached to emails sent from FDA, BlackBerry™, Palm Treo™ or other handheld devices. Accordingly, a need exists to reduce the chances of unwanted or unauthorized sharing of metadata, particularly in the context of sharing electronic documents with mobile communications devices.

Accordingly, a need exists to provide an improved system of preventing unwanted or unauthorized transmission of electronic documents with metadata.

SUMMARY

The present invention provides for a computer based system and method for removing metadata from a document attached to an email. An email sent from a mobile device is received by a gateway, email server, or other program. The email is analyzed to determine whether it has an attached document. In the event the email includes an attached document the attached document is analyzed to determine the nature of metadata in the document. If the attached document includes metadata the metadata may be cleaned, or the email and or the attachment may be analyzed to determine whether the metadata is to be removed. If the metadata is to be removed a cleaned version of the attached document is created with the metadata, or the desired portion of the metadata, removed. The attached document is replaced with the cleansed version of the attached document, and the email is sent according to the address (or addresses) included in the email (or other delivery instructions specified in either the email or at the gateway, email server or other program). A copy of the cleansed document may be retained. A person, for example a user or administrator, may be notified of the attempt to send a document with metadata, or a person may be given the option of allowing over-ride cleansing the metadata and sending the original attached document with the metadata. A log of all attachments that were cleaned of Metadata may be optionally saved for any desired duration.

DETAILED DESCRIPTION

The present invention is described in the context of a specific embodiment. This is done to facilitate the understanding of the features and principles of the present invention and the present invention is not limited to this embodiment. In particular, the present invention is described in the context of a computer system used to compare, edit, view and/or modify electronic documents.

Figure 1:
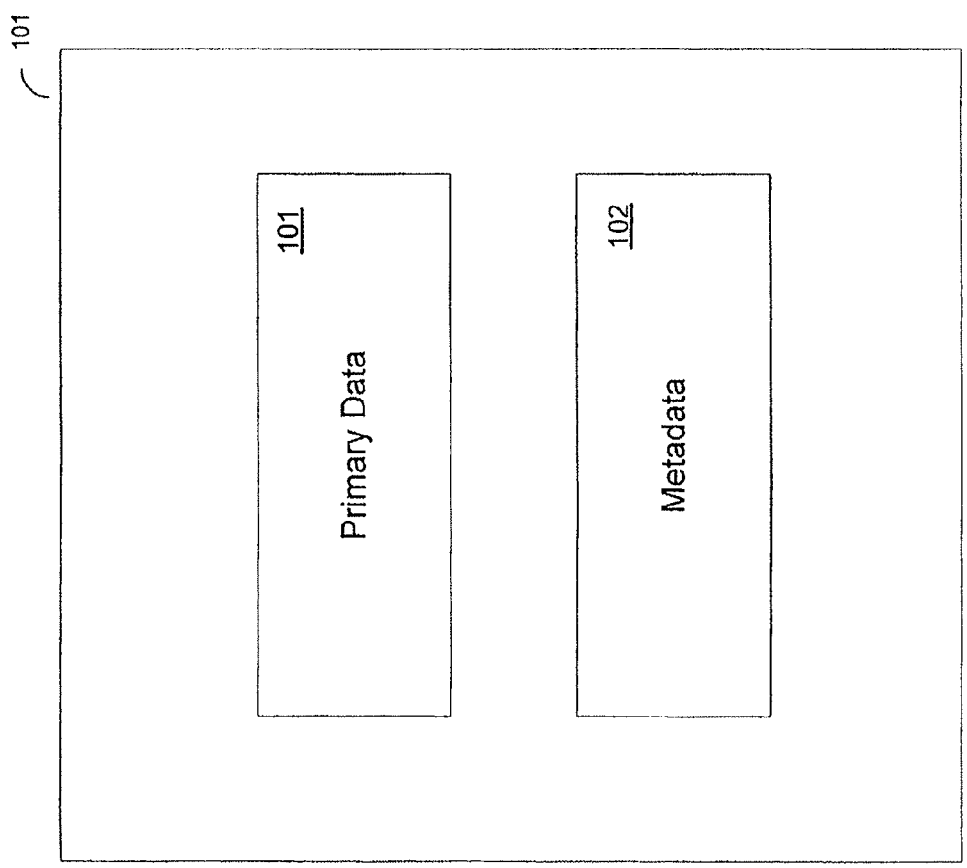
FIG. 1 is a generalized block diagram illustrating a document that may be used with the preferred embodiments.

FIG. 1 is a generalized block diagram illustrating a document 100 that may be used with the preferred embodiments. Document 100 includes primary data 101 and metadata 102. Primary data, in the presently preferred embodiment, includes the information content of the document. By way of example, a document including the play Romeo and Juliet by William Shakespeare would have as the primary data the content information, the prose and words of the play. Additionally, in the presently preferred embodiment, the primary data may include formatting data, such as data on page breaks, paragraph separation and format, text size and type, etc. In the present example metadata 102 may include the author or creator of the document, original name of the document, the time and date the document was created and/or modified, version or history information on the document, including changes made by one or multiple users with user identification, editing time, etc.

Figure 2:
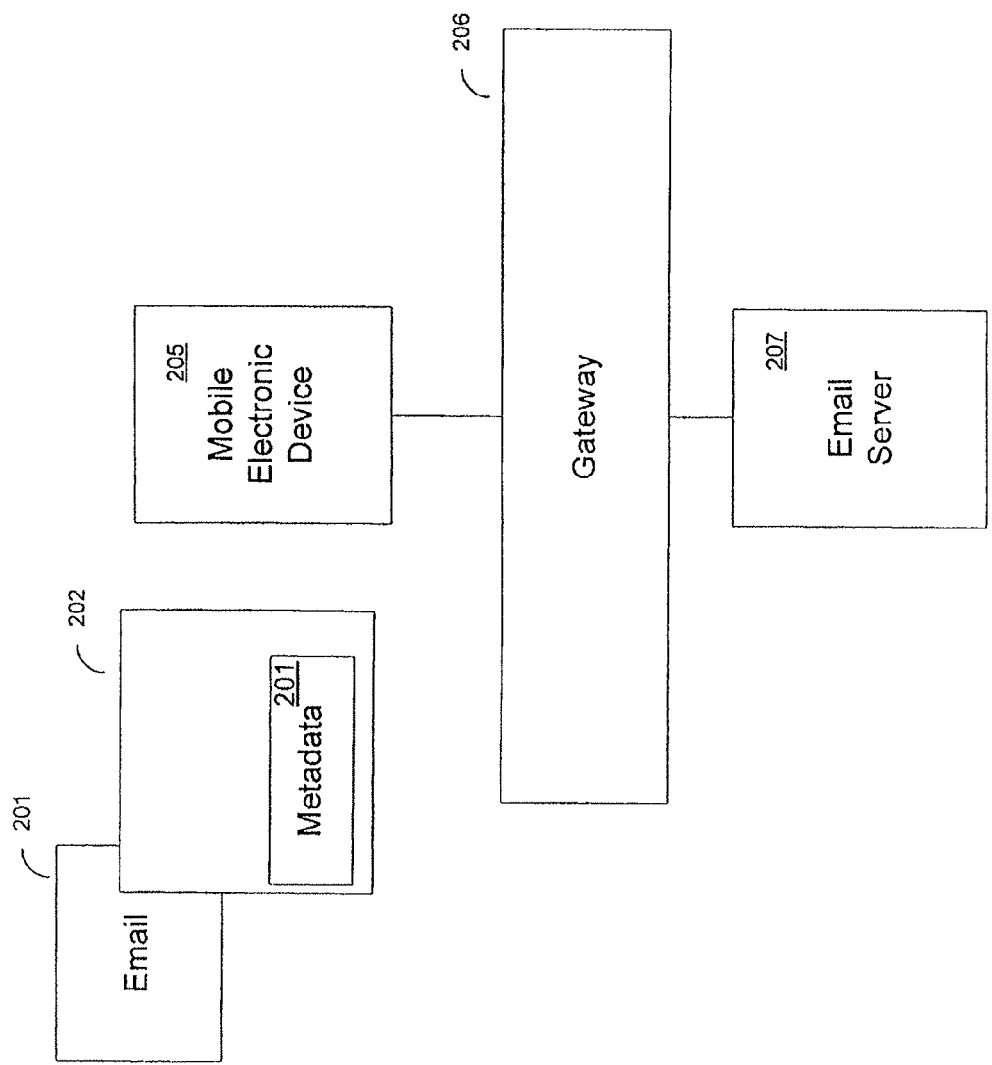
FIG. 2 is a generalized block diagram illustrating the process of removing metadata from an electronic document attached to an email, according to one possible embodiment.

FIG. 2 is a generalized block diagram illustrating the process of removing metadata 201 from an electronic document 202 attached to an email 203. The email 204 is sent from a mobile electronic device 205. In the presently preferred embodiment, electronic device is an end-user device, such as a smart phone or PDA, or other mobile electronic device capable of sending an email with an attachment. The email 203 may be sent to a gateway 206 which implements the metadata removal process described below, or the email may be sent to an email server 207, or to another program in communication with the email server. In the event the email is sent from the electronic device to the email server, the email server may send the email with the attached document to the gateway, or the email server may perform the metadata removal process. In the event the metadata removal is performed by the gateway 206, the email 203 with the attached document with the metadata removed is sent to the email server 207. Alternatively, the email with the attachment with the metadata removed may be sent from the email server if the email server performs the process of removing the metadata from the attachment. In yet another embodiment, the gateway may receive the email with the attachment from the email server, and perform the process of removing the metadata from the attachment at the gateway, and the email with the attached document with the metadata removed may be sent or forwarded by the gateway.

Figure 3:
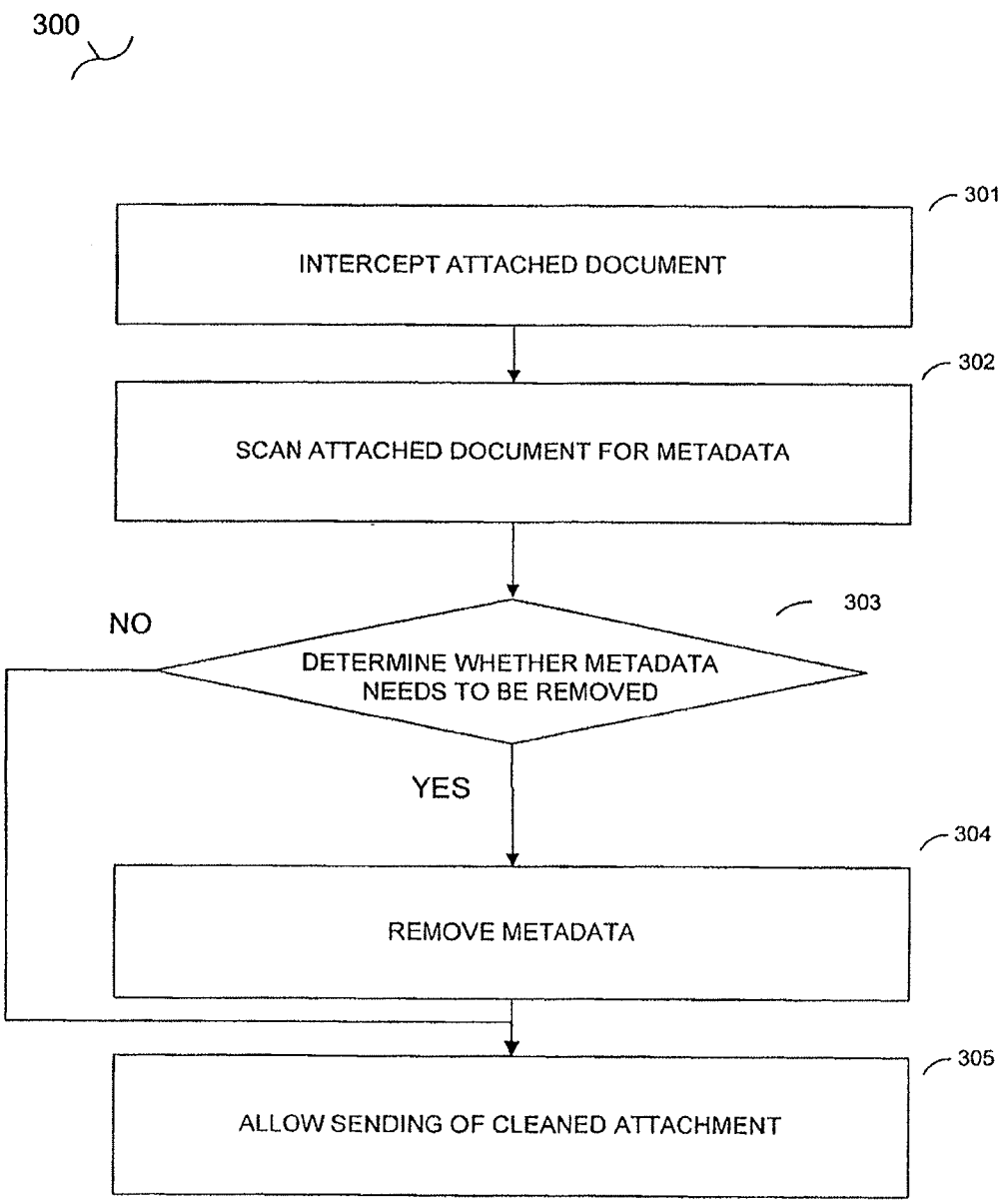
FIG. 3 is a generalized block diagram illustrating the process of removing metadata from an electronic document attached to an email, according to one possible embodiment.

FIG. 3 is a generalized block diagram illustrating the process 300 of removing metadata from an electronic document attached to an email sent from a mobile electronic device. At step 301 the email is received from the mobile electronic device. In the presently preferred embodiment, the email is received prior to the email being received by an email server, such as Microsoft Exchange Server or similar email servers. Alternate embodiments may receive the email from an email server, or the present process may be performed by an email server or computer program in communication with the email server.

At step 302 the received email is analyzed to determine whether it has an attachment. If at step 302 it is determined that the received email has an attachment, then the process proceeds to step 304. If at step 302 it is determined that the received email does not have an attachment, the process proceeds to step 303. At step 303 the email is sent according to the addressing information contained in the email. The email may be sent to an email server for sending, or if the process 300 is being performed by the email server step 303 may be the process of sending email according to the processes and protocols of the email server.

In the presently preferred embodiment, at step 304 the attached electronic document is analyzed first analyzed for document type. As an example MS OFFICE (e.g. Word), PDF, text (.txt), etc. Next, the documents are for metadata. If at step 304 the attached electronic document contains metadata that the user or administrator has selected as "to be removed" (Metadata properties can be pre configured to remove some or all metadata), then at step 305 the metadata is removed from the attached electronic document. The metadata may be removed from the attached electronic document by invoking a metadata removal application, for example: Metadata Sweeper by Litera®, Metadata Assistant by Payne OCnsulting™, iScrub by Esquire™ Innovations™, Protect by Workshare™, Out of Sight by Softwise™, etc. At step 306 a cleansed version of the attached electronic document is created from the output of step 305. In the presently preferred embodiment, the cleansed version of the attached electronic document contains all of the primary data of the electronic document, but without the metadata associated with the attached electronic document. In one alternative embodiment, step 305 removes only a portion of the metadata of the original document, the portion removed which may be configurable or in accordance with a metadata removal policy. In the presently preferred embodiment, the cleansed version of the attached electronic document has all of the same attributes, such as the ability to edit and modify the document.

At step 307 the cleansed version of the attached electronic document, or cleansed electronic document, is used to replace the attached electronic document in the received email. At step 308 the received email, with the cleansed electronic document attached, is sent. In one preferred embodiment, the email is sent to an email server, which would then handle the email according to the addressing information and instructions. In alternate embodiments the email server may have already performed the necessary sending operation and the process 300 is an after-sending check to prevent unauthorized or unwanted transmission of metadata. In another alterative embodiment, the process 300 may be performed by the email server, and step 308 may include the process of sending the email performed by the email server.

At step 309 cleansed version of the attached electronic document may be saved, either on a server, in attached or networked storage, or on the end-user's electronic device.

Alternate embodiments of the present invention may alert the end user that the attached electronic document has been cleansed prior to transmitting a cleansed version.

Additionally, alerts may be sent to an admin, or a log of an attempted sending of an un-cleansed document may be stored and/or reported.

While process 300 describes the intercept of all emails with attachments, alternate embodiments could determine whether to intercept an email according to one or more policies or algorithms. For example, policies may be used to determine whether to cleanse an email according to sender, recipient, type of attachment, aspects of primary data, aspects of metadata, etc.

Figure 4:
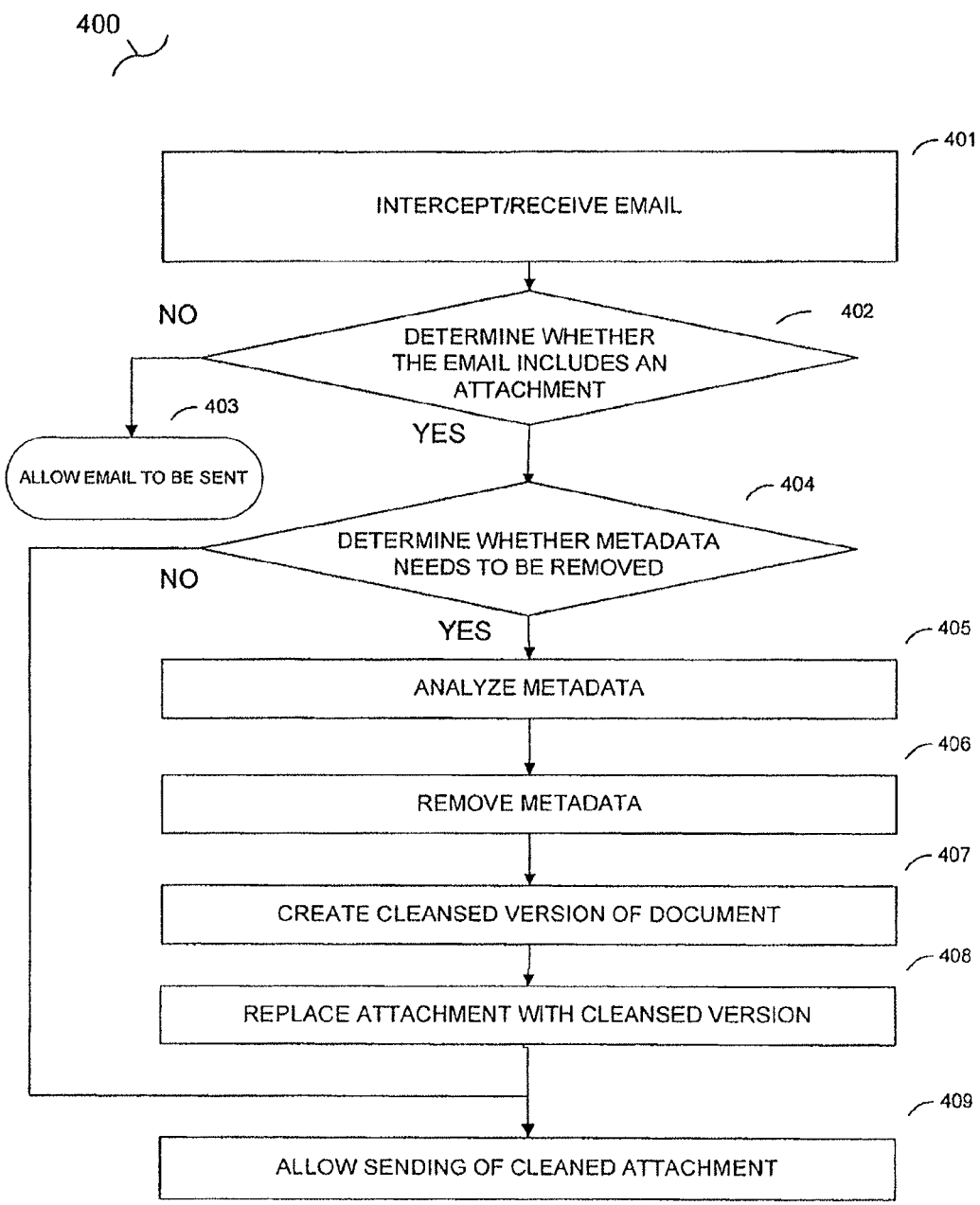
FIG. 4 is a generalized block diagram of a process of removing metadata from email attachments, according to one possible embodiment.

FIG. 4 is a generalized block diagram of a process 400 of removing metadata from email attachments. At step 401 the email is received from a mobile electronic device. In the presently preferred embodiment, the email is received prior to the email being received by an email server, such as Microsoft Exchange Server or similar email servers. Alternate embodiments may receive the email from an email server, or the present process may be performed by an email server.

At step 402 the received email is analyzed to determine whether it has an attachment. If at step 402 it is determined that the received email has an attachment, then the process proceeds to step 404. If at step 402 it is determined that the received email does not have an attachment, the process proceeds to step 403. At step 403 the email is sent according to the addressing information contained in the email. The email may be sent to an email server, or if the process 400 is being performed by the email server step 403 may include sending email according to the processes and protocols of the email server.

At step 404 the attached document is analyzed to determine whether to remove metadata from the attached document. A cleansing policy is compared to the information obtained from analyzing the attached document to determine whether the attached document is to be cleansed prior to sending the document. The cleaning policy may specify certain types of metadata such as document properties, specific aspects of metadata, for example specific authors, titles, etc., or any other type of metadata that may be included in a document.

If at step 404 the determination is made that the attached document is not to be cleansed, i.e., the attached document will not have metadata removed, then the process proceeds to step 409 where the email with the attached document is sent.

If at step 404 the determination is made to cleanse the attached document, then the process proceeds to step 405 where the attached electronic document is analyzed for metadata. If at step 405 the attached electronic document contains metadata, then at step 406 the pre specified (ether as a default preference, a configured preference, etc.) metadata is removed from the attached electronic document. The metadata may be removed from the attached electronic document by invoking a metadata removal application, such as the examples listed above or other such programs. At step 407 a cleansed version of the attached electronic document is created from the output of step 406. In the presently preferred embodiment, the cleansed version of the attached electronic document contains all of the primary data of the electronic document, but without the metadata associated with the attached electronic document. In the presently preferred embodiment, the cleansed version of the attached electronic document has all of the same attributes, such as the ability to edit and modify the document. At step 408 the cleansed version of the attached electronic document, or cleansed electronic document, is used to replace the attached electronic document in the received email. At step 409 the received email, with the cleansed electronic document attached, is sent. In one preferred embodiment, the email is sent to an email server, which would then handle the email according to the addressing information and instructions. In alternate embodiments the email server may have already performed the necessary sending operation and the process 400 is an after-sending check to prevent unauthorized or unwanted transmission of metadata. In another alterative embodiment, the process 400 may be performed by the email server, and step 409 may include the process of sending the email performed by the email server.

At step 410 cleansed version of the attached electronic document may be saved, either on a server, in attached or networked storage, or on the end-user's electronic device.

Alternate embodiments of the present invention may alert the end user that the attached electronic document has been cleansed prior to transmitting a cleansed version. Additionally, alerts may be sent to an admin, or a log of an attempted sending of an un-cleansed document may be stored and/or reported. Still other embodiments may include seeking confirmation from a person (the sender, an administrator, or another) before cleaning and replacing the attached document, or before sending a cleansed version of the attached document.

While process 300 and 400 were described in the context of a single attachment of an email, multiple attachments, either of the same document type or of multiple document types, may be analyzed and cleansed prior to sending an email.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

I claim:

1. A computer-based system for remotely cleaning metadata from electronic documents, comprising:
   an intermediate computer that is remote from an electronic device, the intermediate computer including:
   a memory storing instructions; and
   a processor configured execute the instructions to:
   receive an electronic document from the electronic device, determine that the electronic document includes a pre-determined type of metadata,
   generate a request for confirmation by a user of the electronic device that at least a portion of the pre-determined type of metadata should be removed,
   based on the confirmation, remove at least a portion of the pre-determined type of metadata from the electronic document, and
   store or transmit the electronic document having at least a portion of the pre-determined type of metadata removed.

2. The computer-based system of claim 1, wherein the processor is further configured to execute the instructions to generate a message confirming the removal of at least a portion of the pre-determined type of metadata.

3. The computer-based system of claim 1, wherein the electronic device is a mobile electronic device.

4. The computer-based system of claim 1, wherein the processor is further configured to execute the instructions to receive an electronic document from the electronic device by email.

5. The computer-based system of claim 1, wherein the pre-determined type of metadata comprises a portion of the metadata in the electronic document.

6. The computer-based system of claim 5, wherein the processor is further configured to execute the instructions to generate a request, to the user of the electronic device, for a selection of the metadata to be removed from the electronic document.

7. The computer-based system of claim 1, wherein the processor is further configured to execute the instructions to remove at least a portion of the pre-determined type of metadata from the electronic document according to a default cleansing policy.

8. A non-transitory computer-readable storage medium storing instructions for remotely cleaning metadata from an electronic document, the instructions causing one or more computer processors to perform operations comprising:
   receiving, at an intermediate computer that is remote from an electronic device, an electronic document from the electronic device,
   determining that the electronic document includes a pre-determined type of metadata,
   generating a request for confirmation by a user of the electronic device that at least a portion of the pre-determined type of metadata should be removed,
   based on the confirmation, removing at least a portion of the pre-determined type of metadata from the electronic document, and
   storing or transmitting the electronic document having at least a portion of the pre-determined type of metadata removed.

9. The storage medium of claim 8, wherein the instructions cause the one or more computer processors to further perform the operation of generating a message confirming the removal of at least a portion of the pre-determined type of metadata.

10. The storage medium of claim 8, wherein the electronic device is a mobile electronic device.

11. The storage medium of claim 8, wherein the instructions cause the one or more computer processors to further perform the operation of receiving an electronic document from the electronic device by email.

12. The storage medium of claim 8, wherein the pre-determined type of metadata comprises a portion of the metadata in the electronic document.

13. The storage medium of claim 12, wherein the instructions cause the one or more computer processors to further perform the operation of generating a request, to the user of the electronic device, for a selection of the metadata to be removed from the electronic document.

14. The storage medium of claim 8, wherein the instructions cause the one or more computer processors to further perform the operation of removing at least a portion of the pre-determined type of metadata from the electronic document according to a default cleansing policy.

15. A computer system for transmitting cleansed versions of electronic documents, the computer system being remote from an electronic device, and comprising:
an intermediate computer in communication with the electronic device, the intermediate computer comprising a processor configured to perform the operations of:
receiving, at the intermediate computer, an electronic document from the electronic device,
determining that the electronic document includes a pre-determined type of metadata,
generating a request for confirmation by a user of the electronic device that at least a portion of the pre-determined type of metadata should be removed,
based on the confirmation, removing at least a portion of the pre-determined type of metadata from the electronic document, and
storing or transmitting the electronic document having at least a portion of the pre-determined type of metadata removed.

16. The computer system of claim 15, wherein the processor is further configured to generate a message confirming the removal of at least a portion of the pre-determined type of metadata.

17. The computer system of claim 15, wherein the electronic device is a mobile electronic device.

18. The computer system of claim 15, wherein the processor is further configured to receive an electronic document from the electronic device by email.

19. The computer system of claim 15, wherein the pre-determined type of metadata comprises a portion of the metadata in the electronic document.

20. The computer system of claim 19, wherein the processor is further configured to generate a request, to the user of the electronic device, for a selection of the metadata to be removed from the electronic document.

* * * * *